R. R. KEITH.
CINCH PACKING.
APPLICATION FILED MAR. 11, 1909.

931,128.

Patented Aug. 17, 1909.

Witnesses:
Fred Palm
Chas. L. Goss

Inventor:
Robert R. Keith,
By Winkler Flanders Bottum Fawsett
Attorneys.

UNITED STATES PATENT OFFICE.

ROBERT R. KEITH, OF MILWAUKEE, WISCONSIN.

CINCH-PACKING.

No. 931,128.

Specification of Letters Patent.

Patented Aug. 17, 1909.

Application filed March 11, 1909. Serial No. 482,777.

*To all whom it may concern:*

Be it known that I, ROBERT R. KEITH, a citizen of the United States, residing at Milwaukee, in the county of Milwaukee and State of Wisconsin, have invented a certain new and useful Cinch-Packing, of which the following is a specification, reference being had to the accompanying drawing, forming a part thereof.
This invention relates to packing, and the purpose of the invention is to provide a simple, compact and efficient arrangement of mechanism whereby a fluid tight joint may be established and maintained.
The packing of my invention may be applied in any of the various relations and with any of the various devices where a packing may be necessary or deemed desirable in order to prevent the passage of a fluid, as for example, to form a joint around movable members whether reciprocatable or rotatable or oscillatory, as in the case of piston rods, valve stems, etc., or to form a tight joint between members which are intended to be relatively immovable with respect to each other, as in pipe fittings and pipe joints.

Figure 1:
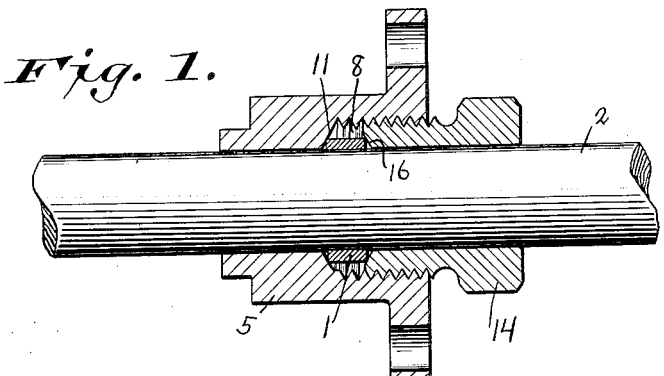
Figure 2:
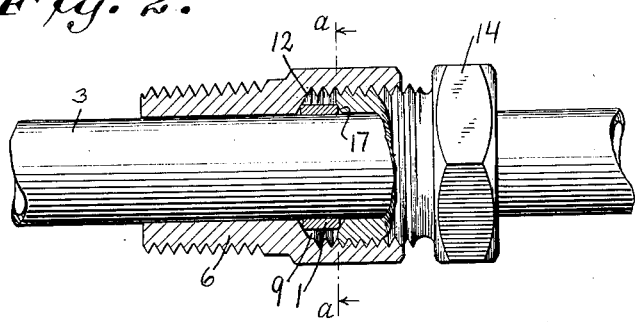
Figure 3:
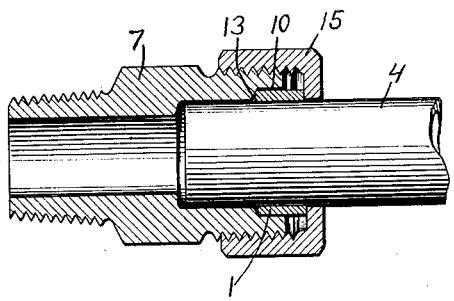
Figure 4:
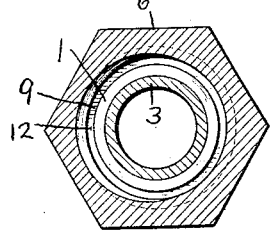

Referring to the drawings which accompany this specification and form a part thereof, Figure 1 illustrates in section my improved packing as applied to a piston rod, valve stem or other member which may be movable within the packing either by reciprocating therethrough or by rotating or oscillating within the packing; Fig. 2 is a section through the packing showing it applied upon a pipe; Fig. 3 is a section through the packing showing it applied to the end of a pipe; and Fig. 4 is a vertical section through the pipe and member shown by Fig. 2 taken on the line *a—a* of Fig. 2, looking in the direction indicated by the arrows.

Referring specifically to the drawings, the numeral 1 designates a packing member which forms a part of the subject matter of my invention and which is the most essential element of my invention. This packing member 1 is a ring which is in fact a section of pipe the ends of which are square or in other words, lie in planes substantially disposed at right angles to the axis of the ring. The internal diameter of this packing member 1 is preferably just large enough to receive the member which it is intended to surround, as for example the piston rod or valve stem 2, shown by Fig. 1 of the drawings, or the pipes 3 and 4 shown by Figs. 2 and 3 of the drawings. An apertured retaining member is provided and the aperture therein is enlarged to form a recess within which the packing member 1 is adapted to be received, as clearly illustrated by the drawings. This retaining member may assume any one of a multitude of different forms as the particular application of the packing may require, as for example, the retaining member may be the gland 5 shown by Fig. 1, the bushings 6 and 7 shown by Figs. 2 and 3, or any other member whatever its form or use in connection with which the packing member 1 is contemplated to be used.

The gland 5 shown by Fig. 1 of the drawings, is any ordinary form of stuffing box gland, such as are ordinarily used in connection with steam cylinders, pumps, valves, etc., and the bushings 6 and 7 are any ordinary forms of bushings, the bushing 6 being of a character to permit the pipe 3 to pass entirely therethrough, while the bushing 7 is of a character to simply permit the end of pipe 4 to be received therein.

The retaining member or gland 5 is provided with the recess 8 and the retaining members or bushings 6 and 7 are provided with the recesses 9 and 10 respectively, within which the packing member 1 is adapted to be received. The ends of the recesses are beveled as indicated by the reference characters 11, 12 and 13 respectively, whereby pressure which forces the packing member 1 against such beveled ends will cause it to clamp the member which it surrounds tightly and produce a fluid tight joint.

The pressure which forces the packing member against the beveled end of the retaining member may be obtained and exerted in any preferred or desirable manner, either by the use of a fluid under pressure or by suitable mechanical means.

Ordinarily in the use of my improved packing some mechanical means will be most convenient for forcing the packing member 1 against the beveled end of the recess of the retaining member, and I have illustrated in the drawings simple forms of followers. These followers illustrated by the drawings are ordinary types of followers used in connection with packing, the form shown in Figs. 1 and 2 being simply an apertured plug which is adapted to be screwed into the retaining members, and as the followers shown by Figs. 1 and 2 are of the same construction, they are designated by the same reference numeral 14. The follower 15 shown by Fig. 3 is of a different construction, but its construction is so clearly shown by the drawings that no specific description is necessary.

When a mechanical follower or equivalent member is used for forcing the packing member 1 against the beveled end of the recess of the retaining member, I prefer to bevel the end of said follower which contacts with the packing member 1, as indicated by the reference characters 16 and 17 on Figs. 1 and 2, although the beveling of the follower may be dispensed with, as shown in the case of the follower in Fig. 3.

The function and operation of my improved packing is as follows: When the packing member 1 or ring is forced against the beveled end of the recess in the retaining member, it is cinched or gripped around the pipe, rod or other member which it surrounds, so as to produce a fluid tight joint, as will be readily apparent from an inspection of the drawings.

What I claim is:

1. The combination in a packing of an apertured retaining member, the aperture therein being enlarged to form a recess with a beveled end, and a ring, one end of which is square, which is adapted to be received within said recess with its square end resting against the beveled end of said recess.

2. The combination in a packing of an apertured retaining member, the aperture therein being enlarged to form a recess with a beveled end, a ring, one end of which is square, which is adapted to be received within said recess with its square end resting against the beveled end of said recess, and a follower for forcing said ring against the beveled end of the recess.

3. The combination in a packing of an apertured retaining member, the aperture therein being enlarged to form a recess with a beveled end, a ring, the ends of which are square, which is adapted to be received within said recess with one end resting against the beveled end of said recess, and a follower for forcing said ring against the beveled end of said recess, the end of the follower which contacts with said ring also being beveled.

4. The combination in a packing of an apertured retaining member, the aperture therein being enlarged to form a recess with a beveled end, a ring, one end of which is square, which is adapted to be received within said recess with its square end resting against the beveled end of said recess, and a member disposed within said ring to be gripped by said ring.

5. The combination in a packing of an apertured retaining member, the aperture therein being enlarged to form a recess with a beveled end, and a ring, the ends of which are square, which is adapted to be received within said recess and rest against the beveled end thereof.

In witness whereof I hereto affix my signature in presence of two witnesses.

ROBERT R. KEITH.

Witnesses:
FRANK E. DENNETT,
W. E. RICHARDSON.